(12) United States Patent
Hunter et al.

(10) Patent No.: US 6,194,940 B1
(45) Date of Patent: Feb. 27, 2001

(54) AUTOMATIC CLOCK SWITCHING

(75) Inventors: Michael James Hunter, Boyertown; Donald H. Friedberg, Breinigsville, both of PA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/406,533

(22) Filed: Sep. 27, 1999

(51) Int. Cl.[7] .................................................... G06F 1/04
(52) U.S. Cl. ............................................. 327/298; 327/294
(58) Field of Search .............................. 327/99, 291, 292, 327/293, 294, 298

(56) References Cited

U.S. PATENT DOCUMENTS

| | | | |
|---|---|---|---|
| 5,136,180 | * 8/1992 | Caviasca | 307/269 |
| 5,845,139 | * 12/1998 | Fischer et al. | 395/750.06 |
| 5,929,713 | * 7/1999 | Kubo et al. | 331/49 |
| 6,084,441 | * 7/2000 | Kawai | 327/99 |

\* cited by examiner

Primary Examiner—Jeffrey Zweizig
(74) Attorney, Agent, or Firm—Duane, Morris & Heckscher LLP

(57) ABSTRACT

A clock switch controller has a clock status register which stores current clock data which identifies which of two or more clock signal sources is a current clock signal source currently in use as a system clock signal source. State machine logic of the controller automatically switches, in response to a clock switch signal, the system clock signal source from the current clock signal source to a new clock signal source of the two or more clock signal sources.

20 Claims, 2 Drawing Sheets

AUTOMATIC CLOCK SWITCHING

BACKGROUND OF THE INVENTION

1. Field of the Invention

The present invention relates to systems with multiple clock sources and, in particular, to switching between clock sources.

2. Description of the Related Art

Systems employing computer processors often provide multiple clock sources which can be used as a system clock to drive the processor, other components of the system, or the entire system. For example, various comparatively "fast" and "slow" clocks may be available. Fast clocks include the default external clock and a phase-locked loop (PLL) clock. The external clock may run at 100 MHz, for example, and is a crystal-based clock. The PLL clock may run at a multiple of this frequency, e.g. at 200 MHz.

Slow clocks include a ring oscillator and an internal "real-time" clock. The ring oscillator provides an inexact frequency, e.g. in the range of 20–100 kHz. An internal clock typically requires a crystal and may run at a fixed, exact frequency of 32 kHz, for example.

In many devices, it is desired to save power and thus the system utilizes slower clocks when possible to save power. For example, in a cordless or cell phone containing a microprocessor system, a real-time clock may be utilized when the phone is in "sleep" mode. Alternatively, if the real-time clock is not available because it is not desired to install a crystal, the ring oscillator may be used in sleep mode. The phone occasionally needs to wake up. This may happen in response to a periodic interrupt signal INT received from a timer circuit (the "wait-for-interrupt" mode), or in response to a wake up signal generated by the processor in response to the user turning on the phone.

When this occurs, a higher speed clock, such as the external clock, needs to be switched to. If the external clock is in use and the application running on the processor determines that even more speed is necessary, the system can switch the system clock from the external clock to the PLL clock.

When the system is using one of the faster clocks, it is sometimes desired to switch to one of the slow clocks, e.g. when the phone enters sleep mode or is turned off by the user. A network of switches or multiplexers (MUXes) under the control of select control signals are typically used to route the appropriate output clock signal from the selected clock source to the system or other component that is to use the selected clock signal.

In such systems having several clocks of differing frequencies, a way of switching between such sources is needed. Current techniques are unsatisfactory for a variety of reasons. The programmer of the application run by the processor (typically stored in a ROM in the system) must manually program a large and complex number of instructions to ensure that the switching is done properly. Moreover, because these instructions are executed by fetching them one at a time from memory, there can be undesirable delays in switching clock sources. In addition, if the processor is using a slow clock, it executes the instructions to switch to a faster clock at the slower clock rate, thus further delaying the clock switch.

Thus, in previous techniques, the programmer has to manually perform the switch by repeatedly executing instructions which write values to control registers within the clock switch circuitry. This can be complicated because different types of clock sources have their own way of controlling the switching process. For example, to switch from one clock source to a PLL clock, the programmer must program the following instructions to occur:

1. Turn on the PLL clock;
2. Wait for lock to occur (this step itself may require many instructions);
3. Switch to the PLL clock; and
4. Turn off the previous source.

A disadvantage of this technique is the large number of instructions that must be written by the programmer, and the delay that will be caused during the switch as these instructions are executed by the processor.

When running the processor with a slow clock (e.g., the real-time clock or a ring oscillator) in wait-for-interrupt mode, it is important for the clock switching circuitry to switch to the fast clock as quickly as possible. Current designs rely on the execution of an "interrupt" sequence of instructions similar to those listed above:

1. See the interrupt;
2. The processor branches to the interrupt code (sequence of instructions);
3. Switch to the faster clock (either PLL clock or external clock, for example).

Because the system is running on the slower clock for most of these instructions, the time to respond to an interrupt can be slower than desired.

SUMMARY

In the present invention, a clock switch controller has a clock status register which stores current clock data which identifies which of two or more clock signal sources is a current clock signal source currently in use as a system clock signal source. State machine logic of the controller automatically switches, in response to a clock switch signal, the system clock signal source from the current clock signal source to a new clock signal source of the two or more clock signal sources.

DESCRIPTION OF THE PREFERRED EMBODIMENT

The present invention provides a clock switch controller that can switch to a desired clock in response to a request to switch to that clock, thus simplifying the programmer's job by reducing the number of instructions required to make the switch. The switching time is also reduced because the (hardware) clock switch controller can perform the switch more quickly than processor executing instructions. The present invention also reduces the time needed to respond to an interrupt by automatically switching from a slow clock to a fast clock in response to the interrupt. Thus, the present invention provides for automatic clock switching, thereby reducing the number of instructions needed to switch clock sources and also reducing the time to respond to an interrupt.

Figure 1:
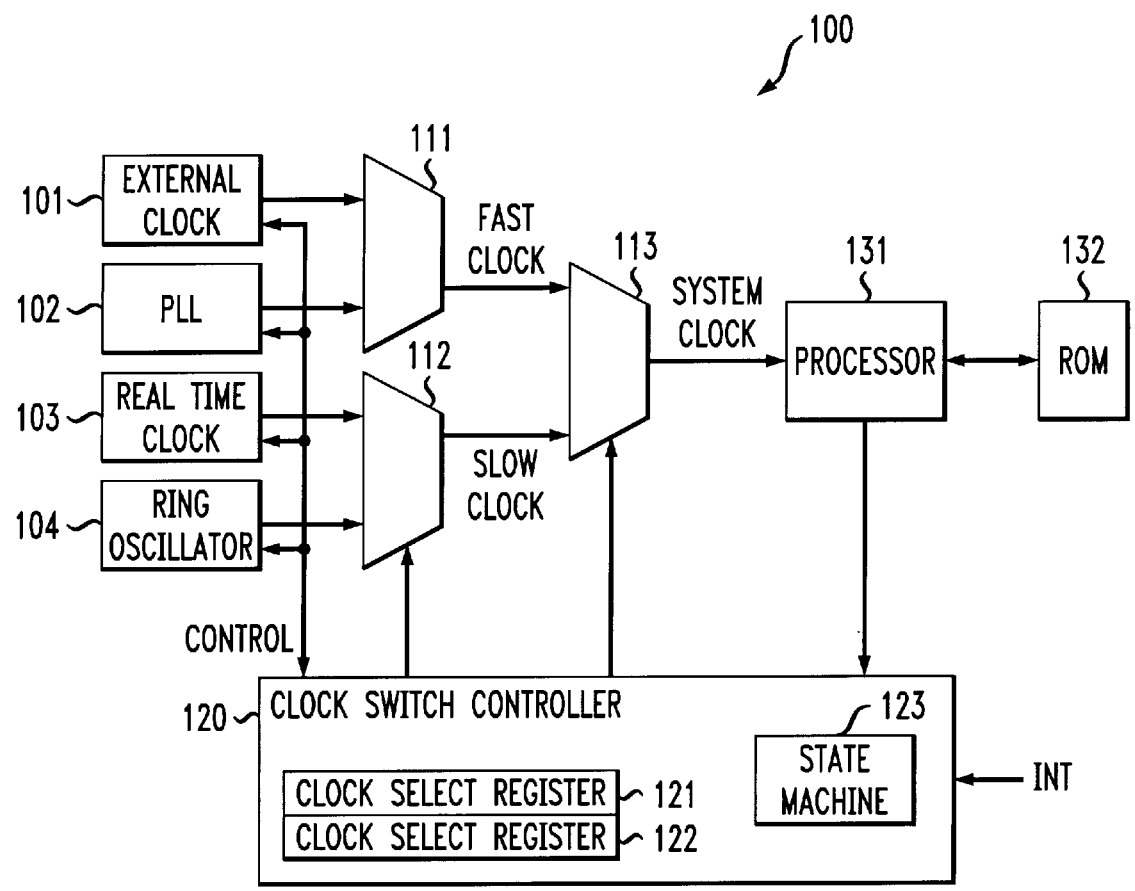
FIG. 1 is a block diagram of a multiple clock switching system, in accordance with an embodiment of the present invention.

Referring now to FIG. 1, there is shown a block diagram of a multiple clock switching system 100, in accordance with an embodiment of the present invention. System 100 comprises a system processor 131, which can run a background or monitoring program or application which is stored in ROM 132. System 100 includes four possible clock sources: external clock 101, PLL clock 102, real-time clock 103, and ring oscillator 104. In general, a plurality of clock sources may be used. In a preferred embodiment, some of the plurality of clocks available are designated as comparatively "fast" clock sources. In the embodiment of system 100, external clock 101 and PLL clock 102 are the two fast clock sources.

A clock switch controller 120 is used to automatically switch to the appropriate clock in response to a clock select request received from processor 131, or in response to a clock interrupt signal INT. In general, both the clock select request or the clock interrupt signal may be considered to be clock switch signals. A clock select request from processor 131 itself contains the identity of the clock which should be switched to (if necessary). A clock interrupt connotes that the most recently used fast clock should be switched back to (if necessary).

Clock switch controller 120 thus receives as inputs one or more types of clock switch signal, such as the clock select request command from processor 131 or the hardware clock interrupt, and generates the appropriate control signals for the current clock and the new clock, e.g. to start the new clock, if necessary, and to stop the old clock, if necessary, after the new clock has been switched to. Controller 120 also generates the appropriate switch or MUX select signals that control an appropriate switch or MUX network to provide the selected clock signal of the plurality of clock signals as the system clock. Controller 120 may also receive feedback from some or all of the clock sources, e.g. a "lock" signal from a PLL clock which lets the controller know the PLL clock has locked and thus is generating the appropriate frequency and thus is ready to be switched to. All or part of the circuitry of system 100, such as the circuitry of clock switch controller 120, may be fabricated in one or more integrated circuits (ICs), within a semiconductor chip, formed in the substrate of a physical wafer, e.g. a silicon wafer. For example, clock switch controller 120 and related components of system 100 may be part of an IC which may be a device such as a digital signal processor, microcontroller, or microprocessor. MUXes 111, 112, and 1 13 may be considered, in one embodiment, as part of or incorporated within clock switch controller 120.

Processor 131 receives and is driven by the system clock signal received from MUX 113. The MUX network comprising MUXes 111, 112, and 113 route one of the four clock signals as the system clock clock signal, in response to MUX select signals received from clock switch controller 120. In one embodiment, MUX 113 selects between a fast and a slow clock signal. Which of the two fast clock signals is provided as an input to MUX 113 depends on which of the external clock 101 and PLL clock 102 are selected by MUX 111 in accordance with the select signal from controller 120. Likewise, which of the two slow clock signals is provided as an input to MUX 112 depends on which of the real-time clock 103 and ring oscillator 104 are selected by MUX 111 in accordance with the select signal from controller 120.

As noted above, clock switch controller 120 can receive clock select instructions from processor 131; and can also receive an interrupt signal INT which indicates that the system is to switch to one of the faster clocks, either external clock 101 or PLL clock 102, whichever was selected the last time a fast clock was used.

Figure 2:
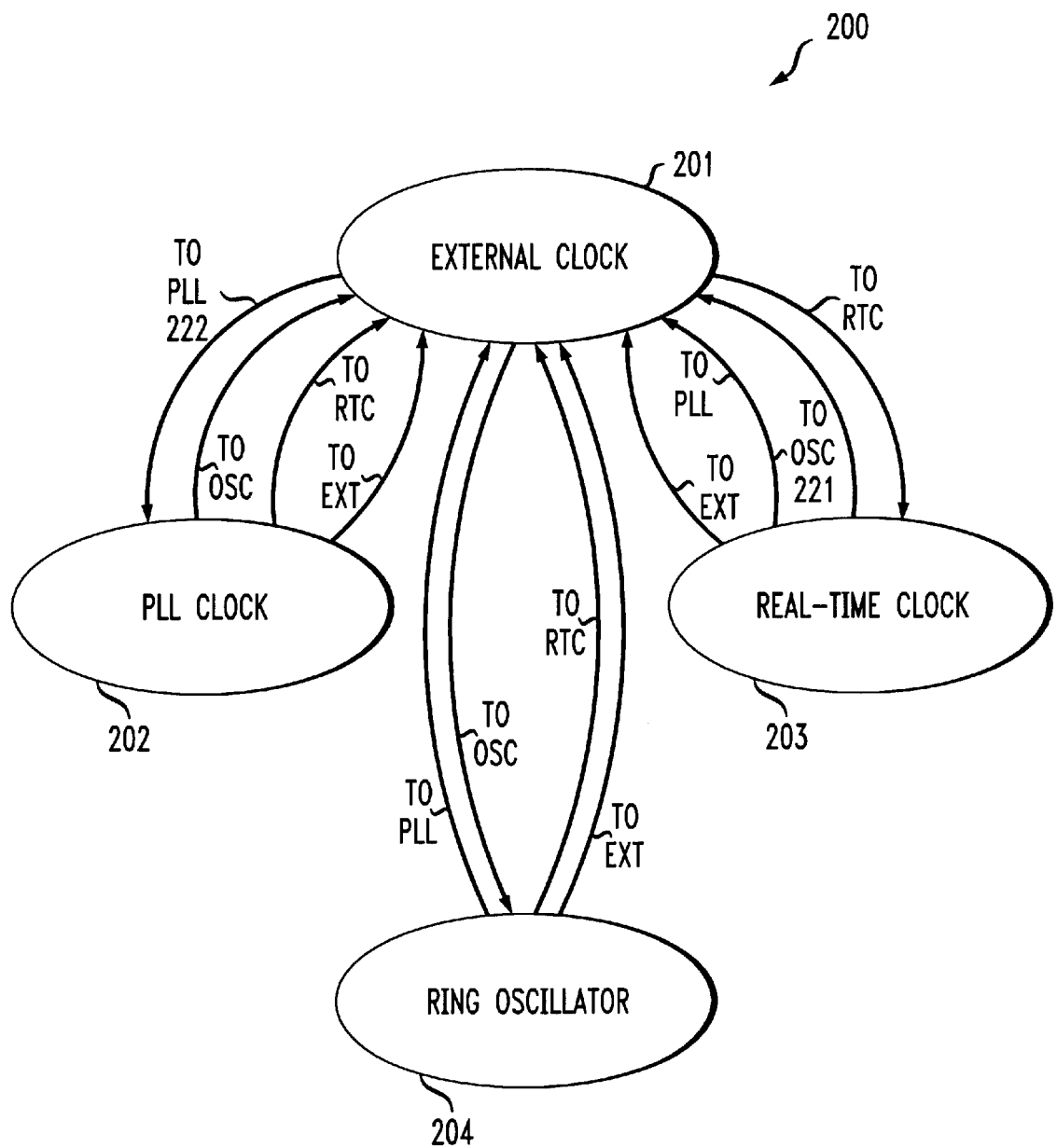
FIG. 2 is a diagram illustrating the state machine logic of the clock switch controller of FIG. 1, in accordance with an embodiment of the present invention.

Controller 120 contains a clock select register 121 and a clock status register 122, as well as hardware that implements state machine logic 123 (see FIG. 2). Clock select register 121 may be used to store the new clock indicated by a clock select instruction or command received from processor 131. (Alternatively, because this new clock information or identity is contained in the command received from processor 131, register 121 may be omitted and the information used directly from the command.) The programmer of the program running on processor 131 and stored in ROM 132 can force a clock source switch by simply writing a single value to the clock select register 121, which corresponds to the new clock source. In an embodiment, register 121 is a four-bit register, with one bit per clock source; the bit for the selected clock source is set and the others are reset, for example. Alternatively, a two-bit register may be utilized, as long as there are enough bit combinations to represent all of the available clock sources.

Clock status register 122 contains information which indicates the current source of the system clock signal and also the last source of the fast clock, i.e. it contains or stores two fields or portions of data, the current clock source field and the last fast clock source field. Thus, in the four-clock embodiment of system 100, at least two bits and up to four are used to indicate the current source, and at least one bit and up to two are used to indicate which of external clock 101 and PLL clock 102 were last used as a fast clock. Where the current clock is one of the fast clocks, then these fields are identical.

State machine logic 123 performs the actual switching of the clocks which is represented functionally as MUXes 111, 112, and 113 in FIG. 1. Each of the clock sources 101–104 receives control signals from controller 120, which control how the clock source operates, e.g. when it starts, when it stops, etc. The state machine logic 123, which is implemented in hardware, is configured to step through a required sequence of operations to cause the various switches to occur.

Conceivably, there could be a possible switch from any of the four clocks to any of the other three. In an embodiment, however, to limit the complexity of state machine logic 123, the only possible state transitions are those to or from the external clock 101 state. Thus, to switch from real-time clock 103 to PLL clock, the real-time clock state transition to the external clock state, which then transitions to the PLL clock state. In alternative embodiments, state machine logic 123 can provide for the required steps to make a state transition from any state to any other state.

When a hardware clock interrupt is received by clock switch controller 120, state machine logic 123 automatically looks at the contents of clock status register 122 to determine the current state as well as the previous fast clock state. If the current clock is a fast clock, the two fields of register 122 will indicate the same clock source or state and nothing needs to be done. However, if the current clock is one of the slow clocks 103, 104, as indicated by the contents of the current clock source portion of register 122, then state machine logic automatically switches to whichever of the fast clocks 101, 102 is indicated in the last fast clock source. The switch from the current state to the designated fast state is accomplished with a sequence of steps as illustrated in state machine diagram 200 of FIG. 2, which are implemented automatically by state machine logic 123 without being controlled or monitored by processor 131.

When a clock select request command is received from processor 131 by clock switch controller 120, this command contains the identity of the new clock source to be used. State machine logic 123 automatically compares this information (which may be stored in clock select register 121 and retrieved from this register or extracted directly from the incoming instruction) with the current clock field of clock status register 122. If these are the same, nothing need be done. Otherwise, state machine logic automatically switches from the current clock source to the new clock source, by performing a sequence of steps as illustrated in state machine diagram 200 of FIG. 2, which are implemented automatically by state machine logic 123 without being controlled or monitored by processor 131.

Thus, whether the clock switch signal is a clock select request or a clock interrupt signal, state machine logic 123 always determines the current state by consulting the current clock field of clock status register 122, and compares this to the new clock to be switched to. The new clock information is either derived from the information placed in clock select register 121 by the clock select request instruction (or directly from the instruction itself); or, in the case of a clock interrupt, from the last fast clock field of clock status register 122. If the current and new clocks are the same, nothing need be done. Otherwise, state machine logic 123 automatically implements the necessary steps required to switch from the current clock to the new clock source.

Referring now to FIG. 2, there is shown a state machine diagram 200 illustrating the operation of the state machine logic 123 of the clock switch controller 100 of FIG. 1 in further detail. To select a new clock source, the programmer simply writes an instruction in the code which causes the corresponding value for the new source to be written into clock select register 121 by a clock select request instruction. Alternatively, if there is an interrupt, clock switch controller 120 consults the last fast clock field of clock status register 122 to determine the new clock source. Once the new clock source is determined, state machine logic 123, as illustrated in the diagram of FIG. 2, combines this information with the current clock field of clock status register 122 to determine the sequences of steps needed to execute the switch, and then performs these steps.

For example, if system 100 is currently running with real-time clock source 103 as the system clock, then the system is in state 203, as indicated by the current clock source value stored in clock status register 122. Processor 131 may transmit a clock select instruction to controller 120, which causes a new value to be loaded into clock select register 121 indicating that PLL clock 202 is needed. Upon receipt of this instruction from processor 131, the state machine logic 123 performs the following steps. First, it knows system 100 is in state 203 from consulting the current clock field of clock status register 122, and it knows to switch to PLL clock 202 from the value in clock select register 121 and from the fact that these two values are not the same. Thus, when there is a difference between the current clock source value in clock status register 122 and the new clock source value in clock select register 121, state machine logic 123 knows it needs to make a switch, and also which state the system is in and which state it needs to transition to.

Thus, state machine logic 123 automatically and quickly performs the steps hardwired into the logic associated with the "to PLL" transition 221, to transition momentarily to external clock state 201. Then, it performs the steps associated with the "to PLL" transition 222 to PLL clock state 202, to cause PLL clock 102 to be selected as the new system clock. External clock state 201 may be a "default" or boot state, such that, whenever system 100 is turned on from a cold or off state, the system automatically enters external clock state 201 (thus using external clock 101 as the system clock) as a default.

In prior art clock switching techniques, these steps are determined by the programmer and included in the code being executed by processor 131, and each operation must be explicitly performed by executing instructions on processor 131. Thus, an advantage of controller 123 is that this knowledge of the steps required resides in the hardware of controller 123 and the programmer need not be aware of it.

When an interrupt occurs when the system 100 is in a wait-for-interrupt mode, the INT signal received by clock switch controller 120 causes state machine logic 123 to automatically switch back to the clock source that was selected prior to entering the wait-for-interrupt state (which may be state 203 or 204, for example). As explained previously, the previous fast clock source is stored in the last fast clock field of clock status register 122. Thus, in response to the interrupt signal, state machine logic 123 combines the information from current clock field of clock status register 122 (i.e., real-time clock 103 or ring oscillator 104) and the last fast clock information in the last fast clock field of clock status register 122 (i.e., external clock 101 or PLL clock 102), and determines the sequence of steps needed to execute the switch. These steps are then performed. One advantage of these technique is that the processor 131 almost immediately beings executing at the faster clock rate. By contrast, in previous techniques, the clock switch was done through multiple processor instructions, and these were operating at the slow clock rate.

Accordingly, the present clock switch controller provides automatic switching which allows a programmer to execute only one instruction to switch to another clock source, and results in quicker responses to interrupts.

It will be understood that various changes in the details, materials, and arrangements of the parts which have been described and illustrated above in order to explain the nature of this invention may be made by those skilled in the art without departing from the principle and scope of the invention as recited in the following claims.

What is claimed is:

1. A clock switch controller for switching between two or more clock signal sources, comprising:

(a) a clock status register for storing current clock data which identifies which of the two or more clock signal sources is a current clock signal source currently in use as a system clock signal source; and (b) state machine logic that automatically switches, in response to a clock switch signal, the system clock signal source from the current clock signal source to a new clock signal source of the two or more clock signal sources.

2. The clock switch controller of claim 1, wherein clock switch controller is fabricated as part of an integrated circuit.

3. The clock switch controller of claim 2, wherein integrated circuit is one of a digital signal processor, a microcontroller, and a microprocessor.

4. The clock switch controller of claim 1, wherein the state machine logic switches to the new clock signal source only if the current clock signal source is not already the new clock signal source.

5. The clock switch controller of claim 1, wherein the two or more clock signal sources comprise a plurality of clock signal sources.

6. The clock switch controller of claim 5, wherein the plurality of clock signal sources comprises two or more comparatively fast clock signal sources and at least one comparatively slow clock signal source.

7. The clock switch controller of claim 6, wherein the two or more comparatively fast clock signal sources comprises an external clock and a phase-locked loop clock, and the at least one comparatively slow clock signal source comprises a ring oscillator and a crystal-driven internal clock.

8. The clock switch controller of claim 6, wherein:

the clock status register comprises a current clock signal source field for storing the current clock data and a last fast clock signal source field for storing last fast clock data which identifies which of the two or more comparatively fast clock signal sources was most recently selected; and the clock switch signal is one of a clock select instruction designating the new clock signal source and an interrupt signal, wherein if the clock switch signal is an interrupt signal then the new clock signal source is the clock signal source indicated by the last fast clock signal source field.

9. The clock switch controller of claim 5, wherein:

the plurality of clock signal sources comprises a default clock; and all state transitions implemented by the state machine logic are either to or from the default clock, whereby, if neither the current clock signal source nor the new clock signal source are the default clock then a switch from the current clock signal source to the new clock signal source comprises a first switch from the current clock signal source to the default clock followed by a second switch from the default clock to the new clock signal source.

10. The clock switch controller of claim 9, wherein the default clock is used as the system clock signal source upon turning on a system utilizing the system clock signal.

11. The clock switch controller of claim 1, wherein the state machine logic switches the system clock signal source by transmitting a multiplexer select signal to one or more multiplexers for multiplexing the two or more clock signals.

12. In a system having a plurality of clock signal sources and a multiplexer network for selecting one of the clock signal sources as a system clock signal source in response to select signals received from a clock switch controller, a method for switching between clock signal sources comprising the steps of:

(a) storing in a clock status register of the clock switch controller current clock data which identifies which of the clock signal sources is a current clock signal source currently in use as the system clock signal source;

(b) receiving a clock switch signal with the clock switch controller; and (c) automatically switching, with state machine logic of the clock switch controller, the system clock signal source from the current clock signal source to a new clock signal source of the plurality of clock signal sources.

13. The method of claim 12, wherein the state machine logic switches to the new clock signal source only if the current clock signal source is not already the new clock signal source.

14. The method of claim 12, wherein the plurality of clock signal sources comprises two or more comparatively fast clock signal sources and at least one comparatively slow clock signal source.

15. The method of claim 14, wherein the two or more comparatively fast clock signal sources comprises an exter nal clock and a phase-locked loop clock, and the at least one comparatively slow clock signal source comprises a ring oscillator and a crystal-driven internal clock.

16. The method of claim 14, wherein:

the clock status register comprises a current clock signal source field for storing the current clock data and a last fast clock signal source field for storing last fast clock data which identifies which of the two or more comparatively fast clock signal sources was most recently selected; and the clock switch signal is one of a clock select instruction designating the new clock signal source and an interrupt signal, wherein if the clock switch signal is an interrupt signal then the new clock signal source is the clock signal source indicated by the last fast clock signal source field.

17. The method of claim 12, wherein:

the plurality of clock signal sources comprises a default clock; and all state transitions implemented by the state machine logic are either to or from the default clock, whereby, if neither the current clock signal source nor the new clock signal source are the default clock then a switch from the current clock signal source to the new clock signal source comprises a first switch from the current clock signal source to the default clock followed by a second switch from the default clock to the new clock signal source.

18. The method of claim17, wherein the default clock is used as the system clock signal source upon turning on the system and the state machine logic switches the system clock signal source by transmitting the select signal to the multiplexer network.

19. An integrated circuit having a clock switch controller for switching between a plurality of clock signal sources comprising a comparatively fast external clock, a comparatively fast phase-locked loop clock, a comparatively slow ring oscillator, and a comparatively slow crystal-driven internal clock, wherein the external clock is used as a system clock signal source upon turning on a system utilizing the system clock signal, the clock switch controller comprising:

(a) a clock status register for storing current clock data which identifies which of the plurality of clock signal sources is a current clock signal source currently in use as the system clock signal source, wherein the clock status register comprises a current clock signal source field for storing the current clock data and a last fast clock signal source field for storing last fast clock data which identifies which of the external clock and the phase-locked loop clock was most recently selected; and (b) state machine logic that automatically switches, in response to a clock switch signal, the system clock signal source from the current clock signal source to a new clock signal source of the two or more clock signal sources, wherein the clock switch signal is one of a clock select instruction designating the new clock signal source and an interrupt signal, wherein if the clock switch signal is an interrupt signal then the new clock signal source is the clock signal source indicated by the last fast clock signal source field, wherein the state machine logic switches to the new clock signal source only if the current clock signal source is not already the new clock signal source and the state machine logic switches the system clock signal source by transmitting a multiplexer select signal to a multiplexers network for multiplexing the two or more clock signals, further wherein all state transitions implemented by the state machine logic are either to or from the external clock, whereby, if neither the current clock signal source nor the new clock signal source are the external clock then a switch from the current clock signal source to the new clock signal source comprises a first switch from the current clock signal source to the external clock followed by a second switch from the external clock to the new clock signal source.

20. The integrated circuit of claim 19, wherein the integrated circuit is one of a digital signal processor, a microcontroller, and a microprocessor.

\* \* \* \* \*